(12) United States Patent
Aoyama et al.

(10) Patent No.: US 7,808,665 B2
(45) Date of Patent: Oct. 5, 2010

(54) IMAGE COMMUNICATION APPARATUS WHICH USES A SIGNAL PROVIDED BY A COMMUNICATION NETWORK TO OPTIMIZE THE QUALITY OF IMAGE DATA FOR COMMUNICATION

(75) Inventors: Motoaki Aoyama, Hachioji (JP); Madoka Kano, Warabi (JP); Shunichi Kumakura, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1351 days.

(21) Appl. No.: 11/257,439

(22) Filed: Oct. 24, 2005

(65) Prior Publication Data

US 2007/0002856 A1 Jan. 4, 2007

(30) Foreign Application Priority Data

Jun. 29, 2005 (JP) .............................. 2005-190199

(51) Int. Cl.
*G06F 15/00* (2006.01)
*G06F 15/173* (2006.01)

(52) U.S. Cl. ..................................... 358/1.15; 709/227
(58) Field of Classification Search .................. 358/1.1, 358/1.9, 1.13, 474, 500, 400, 406, 448; 709/227, 709/228, 229; 370/252, 389
See application file for complete search history.

(56) References Cited

U.S. PATENT DOCUMENTS 6,961,321 B1 * 11/2005 Okanoue et al. ............ 370/313

2005/0275873 A1 * 12/2005 Sekiguchi .................. 358/1.15

FOREIGN PATENT DOCUMENTS

| JP | 63-092162 A | 4/1988 |
| JP | 63-314065 A | 12/1988 |
| JP | 02-076465 A | 3/1990 |
| JP | 06-030218 A | 2/1994 |
| JP | 08-116388 A | 5/1996 |
| JP | 2000-232549 A | 8/2000 |
| JP | 2000-354058 | 12/2000 |
| JP | 2005-109797 A | 4/2005 |

* cited by examiner

*Primary Examiner*—Gabriel I Garcia
(74) *Attorney, Agent, or Firm*—Holtz, Holtz, Goodman & Chick, PC

(57) ABSTRACT

There is described an image communication apparatus and an image communication program capable of transmitting image data with the output attribute conforming to the communication charge, and capable of determining the image data output attribute at an earlier phase. The image communication apparatus includes: a signal judgment section which judges specific signals received via a network; an output setting section which sets output attribution of image data to be transmitted for a destination via the network in accordance with a judgment result by the signal judgment section; a network switching section which switches a network for transmitting the image data to the destination in accordance with the judgment result by the signal judgment section. The signal judgment section judges the specific signals after requesting connection with the destination to the network and before establishing the connection with the destination. The specific signals represent charge information about communication with the destination.

39 Claims, 9 Drawing Sheets

IMAGE COMMUNICATION APPARATUS WHICH USES A SIGNAL PROVIDED BY A COMMUNICATION NETWORK TO OPTIMIZE THE QUALITY OF IMAGE DATA FOR COMMUNICATION

This application is based on Japanese Patent Application NO. 2005-190199 filed on Jun. 29, 2005 in Japanese Patent Office, the entire content of which is hereby incorporated by reference.

BACKGROUND

1. Field of the Invention

The present invention relates to an image communication apparatus and an image communication program using a communication network, particularly to a technique of optimizing the quality of the image data for communication, using the signal provided by the communication network.

2. Description of the Related Art

In recent years, with the development of the Internet protocol communication network (including the Internet), an apparatus equipped with a facsimile communication function utilizing this communication network has come into commercial use. Further, the VoIP (Voiceover Internet Protocol) communication technique wherein communication of audio data is carried out via the Internet communication network has come into widespread use. Particularly the communication based on this technique is called the IP (Internet Protocol) telephony.

When the Internet is used, a contract agreement is with a carrier (provider) based on a flat rate scheme in many cases. In VoIP communication, an addition charge may be imposed, depending on the destination of communication, even if the contract agreement is made based on a flat rate scheme. For example, if the VoIP carrier at the source of communication is the same as that on the destination, VoIP communication is free of charge (without extra charge). If the destination is a public telephone network or a VoIP carrier different from that on the source side, the VoIP communication is carried out on a paid basis (with extra charge). Further, a lower rate may be determined for the VoIP communication between particular VoIP carriers according to the agreement among such carriers. To meet such a situation, in the VoIP communication, an audio signal or the like is used to notify a user of the charge information, showing if the communication is free or not, or if the communication charge is higher or lower, depending on the destination.

In the meantime, the technique of utilizing charge information in the image data communication is exemplified by the one (e.g. Patent Document 1) wherein, for one and the same destination, the communication charge for sending image data via the public telephone network and that for sending image data via e-mail using the Internet facsimile function by dial-up connection with the IP network are separately calculated. The results of calculation are compared with each other, and are notified to the user so that the user can select the most desirable communication medium.

[Patent Document 1]

Tokkai 2000-3584058 (Japanese Non-Examined Patent Publication)

However, the technique disclosed in the Patent Document 1 requires the communication charge to be calculated for each communication medium prior to initiation of communication, and requests the user to select a communication medium. This has involved complicated processing and operation.

In the aforementioned technique, communication media are switched according to the communication charge, and communication charge cannot be reduced on condition of using one and the same communication medium. For example, in the image communication such as facsimile communication, the exchange of capabilities such as image quality and encoding method is carried out with the destination of communication after establishment of communication. Based on the result thereof, the image data output attribute (such as image quality and encoding method) is determined. Thus, even when communication is performed on a free basis or on a paid basis, depending on the destination, as in the VoIP communication, there is an increase in the amount of image data to be sent and in the communication charge on a paid basis, if the encoding method of lower compression rate and higher picture quality are determined as a result of exchanging the capabilities. Such problems have been left unsolved in this conventional art. Further, the output attribute can be determined only after exchange of capabilities. This arrangement has failed to convert the image data quality in the earlier phase.

SUMMARY

In view of foregoing, it is an object of the present invention to provide an image communication apparatus and an image communication program capable of transmitting image data with the output attribute conforming to the communication charge. Another object of the present invention is to provide an image communication apparatus and an image communication program capable of determining the image data output attribute at an earlier phase.

The image communication apparatus comprises a signal judgment section which judges specific signals received via a network; and an output setting section which sets output attribution of image data to be transmitted for a destination via the network in accordance with a judgment result by the signal judgment section.

According to another aspect of the present invention, the image communication apparatus comprises a signal judgment section which judges specific signals received via a network, when the apparatus communicates with a destination via the network; and an output setting section which sets output attribution of image data to be transmitted for a destination via the network in accordance with a judgment result by the signal judgment section, when the apparatus communicates with the destination via the network.

According to another aspect of the present invention, the image communication apparatus comprises a signal judgment section which judges specific signals received via a network; a display section which displays selectable output mode alternatives in accordance with a judgment result by the signal judgment section; a selection section which selects desired output mode among the selectable output mode alternatives displayed in the display section; and an output setting section which sets output attribution of image data to be transmitted for a destination via the network in accordance with output mode selected by the selection section.

According to another aspect of the present invention, the image communication apparatus comprises a signal judgment section which judges specific signals received via a network; and a network switching section which switches a network for transmitting the image data to the destination in accordance with a judgment result by the signal judgment section.

The invention itself, together with further objects and attendant advantages, will best be understood by reference to the following detailed description taken in conjunction with the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
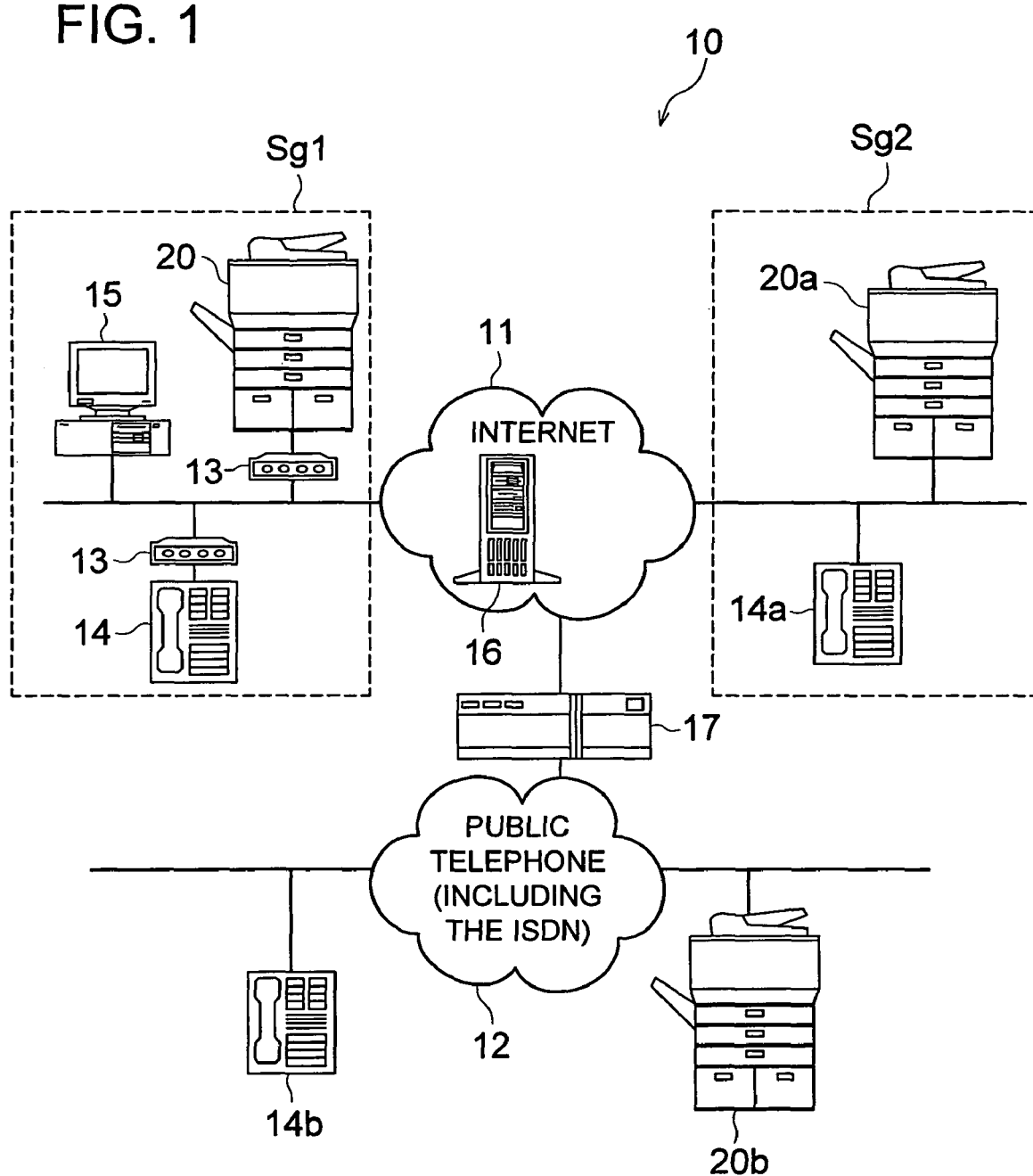
FIG. 1 is an explanatory diagram representing an example of the network configuration for outputting the image data using an image communication apparatus of the present invention.

Referring to the drawings, the following describes the embodiment of the present invention.

FIG. 1 shows an example of an image communication system 10 connected with the image communication apparatus 20 of the present invention.

The image communication system 10 is composed of an Internet 11 as an IP communication network for communication using the Internet Protocol, and a public telephone network 12 including the ISDN. The Internet 11 is connected with the network segments Sg1 and Sg2 as IP communication networks composed in units of office and company. The network segments Sg1 and Sg2 are configured as LAN (Local Area Network).

the network segment Sg1 is connected with a plurality of adaptors 13 and PCs 15. A telephone set 14 and image communication apparatus 20 are connected thereto through the adaptor 13.

Using the voice encoder technique (e.g. based on ITU-T Recommendation G.711), the adaptor 13 converts into data the audio signal inputted from the telephone set 14 and image communication apparatus 20. This data is then formed into data packets, which are sent to the destination of communication. In addition to this function, the adaptor 13 has another function of decoding the received data packets into audio signals and sending them to the telephone set 14 and image communication apparatus 20. There are many ways for implementing the VoIP communication (e.g. SIP (Session Initiation Protocol) and H.323). Any of them can be used if an audio signal can be sent and received on the Internet 11.

The adaptor 13 also has a function of sending the network segment Sg1 connected with the adaptor 13, and the information on the communication network as part of the communication network of the Internet 11, in the form of specific signals, to the telephone set 14 and image communication apparatus 20 connected thereto, The image communication apparatus 20 connected with the adaptor 13 has a function of using a modem to modulate the digital signal including image data, and outputting the result of modulation in the form of audio signals. The adaptor 13 converts the audio signal having been outputted, into data packets, and sends it to the destination.

In the network segment Sg2, the telephone set 14a and image communication apparatus 20a are directly connected to the LAN through a network cable. The telephone set 14a is called the IP telephone set, and incorporates the function of converting the audio signal to data packets. Further, the image communication apparatus 20a incorporates the function of converting the signal used for communication, into an audio signal according to the "deemed audio" method, and converting the audio signal into the data packets. The "deemed audio" signal refers to the analog audio signal obtained by modulating the digital data by a modem.

The network segment Sg2 is implemented, for example, in the form of the IP Centrex for collective management of the IP telephone network containing the extension function in the corporate network, and the IP-PBX performing the function of the PBX (Private Branch Exchange) on the IP communication network. In this form, the communication related to the equipment connected to the network segment Sg2 is controlled by an apparatus (not illustrated) for controlling the data packets.

The Internet 11 is connected with a call control server 16. The call control server 16 conducts a verification to see whether or not communication can be established with the destination to which a call has been originated by the telephone set 14 or 14a, and image communication apparatus 20 or 20a. If the result of this verification shows that the communication can be established, the call control server 16 performs the function of supplying the telephone set 14 or 14a, and image communication apparatus 20 or 20a with the path information, which is the information on the communication path leading to that destination. Based on this path information, the source of communication starts data communication with the destination.

Further, the Internet 11 is connected with a gateway 17, which is installed by a VoIP carrier. The gateway 17 performs the function of connecting the Internet 11 and public telephone network 12.

To put it in greater details, the gateway 17 converts the data packets for VoIP communication on the Internet 11, into signal audio data, and sends it to the destination on the public telephone network 12. In addition to this function, the gateway 17 has the function of encoding the digital audio data on the public telephone network 12, and transmitting it to the destination on a predetermined Internet 11, thereby allowing communication to be made between the equipment connected with the Internet 11, and the equipment connected with the public telephone network 12.

When communication is started from the gateway 17 via the public telephone network 12, the charge for utilizing the public telephone network 12 will be incurred since the public telephone network 12 is used.

Figure 2:
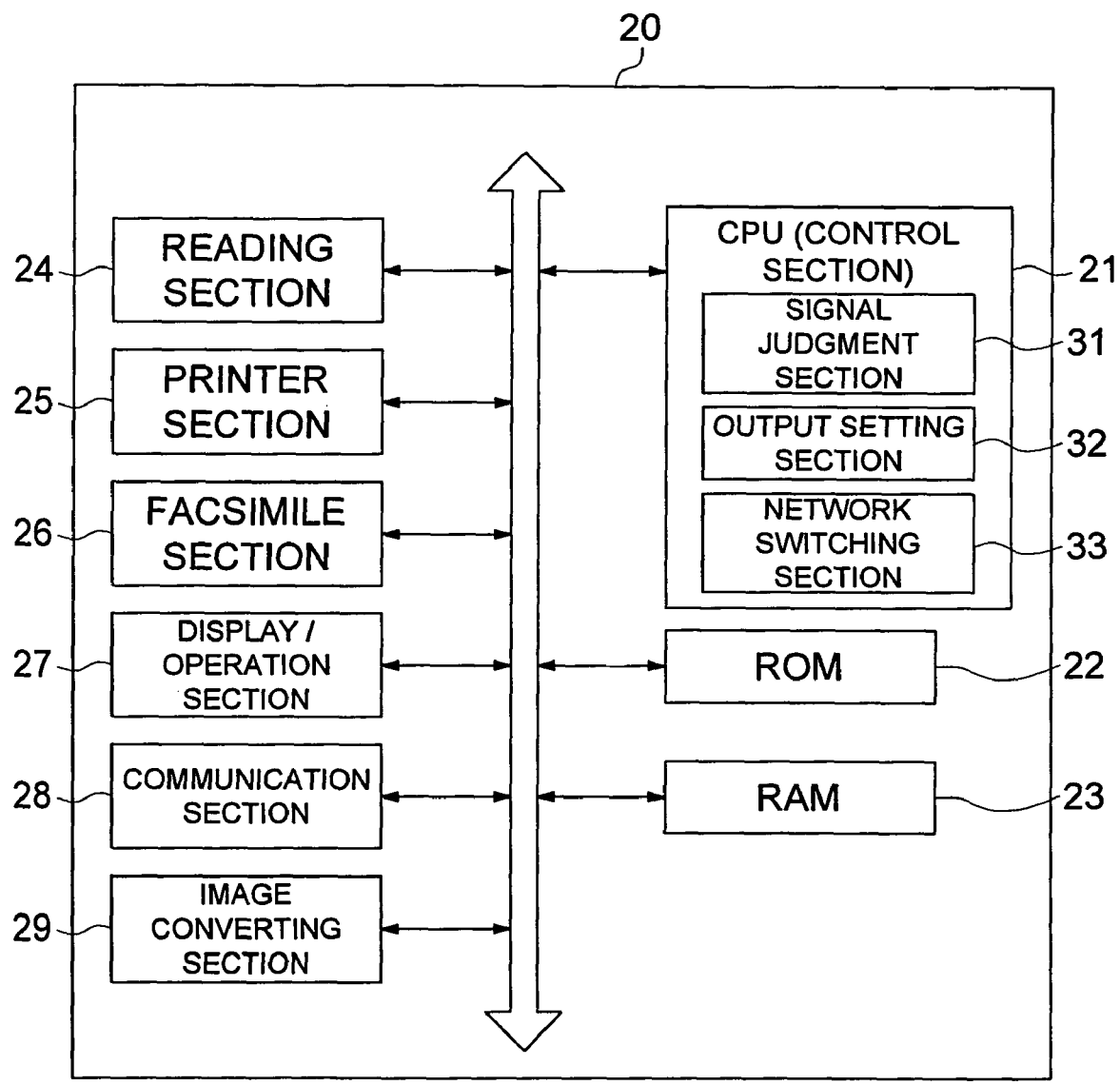
FIG. 2 is a block diagram representing the electrical configuration of the image communication apparatus of the present invention.

FIG. 2 shows the electrical configuration of the image communication apparatus 20 as the present embodiment.

The image communication apparatus 20 has a facsimile transmission function of reading a document and converts it into image data and sending the image data through the public telephone network 12 and IP communication network. It also has a facsimile receiving function of receiving image data from an external apparatus. Further, the image communication apparatus 20 is designed as a multifunction peripheral provided with a copying function of reading a document and printing the copy image, a scanner function of outputting the read image data to the outside, and a printer function of printing in response to received print data.

The image communication apparatus 20 is equipped with a CPU (Central Processing Unit) 21 to provide centralized control of the operations of the aforementioned apparatus. The CPU 21 is connected with a ROM (Read Only Memory) 22, a RAM (Random Access Memory) 23, a reading section 24, a printer section 25, a facsimile section 26, a display/operation section 27, a communication section 28, and an image converting section 29 through the system bus.

The ROM 22 stores the program run by the CPU 21 and various fixed data. The RAM 23 provides the functions of a work memory for storing data temporarily when the CPU 21 executes the program, and a memory page for storing image data temporarily.

The reading section 24 provides the function of reading a document image and capturing the corresponding image data. The reading section 24 is composed of a light source for applying light to a document; a line image sensor for reading one line of the document across the width; a shifting section for shifting the reading position in units of line across the length of the document; and an optical path made up of a lens and a mirror for leading the light reflected from the document, to the line image sensor, and forming an image. The line image sensor is composed of a CCD (Charge Coupled device). The analog image signal outputted from the line image sensor is subjected to analog-to-digital conversion, and is captured as digital image data.

The printer section 25 allows the image corresponding to image data to be formed and outputted onto a recording medium by the electrophotographic process. The printer section 25 is configured as a laser printer containing a recording medium, a conveyance apparatus, a photoreceptor drum, a charging device, a laser unit, a development apparatus, a transfer/detaching apparatus, a cleaning apparatus and a fixing apparatus.

The facsimile section 26 provides a facsimile function. It compresses and expands image data using the compression method conforming to the facsimile, and controls various communication procedures for facsimile transmission and reception. Further, when using the IP communication network to perform facsimile communication, the facsimile section 26 employs the function of outputting the audio signal gained by modulating the digital signal associated with facsimile communication by a modem.

The facsimile section 26 has the function of implementing facsimile transmission on the IP communication network, using the "internet facsimile function" based on the T.37. To put it in greater details, the image data to be outputted is attached to e-mail, which is transmitted and received to output the image data.

The display/operation section 27 includes a liquid crystal display equipped with a touch panel on the surface, and various types of operation switches. It gives various guides and status displays to a user, and receives various operations from the user.

The communication section 28 is provided with an interface for connection with the public telephone network 12 and various types of networks, and communicates with external equipment via these interfaces. For example, it communicates with the equipment, with a network interface, connected with the IP communication network.

The image converting section 29 converts the output attribute of the image data outputted from the facsimile section 26. The image converting section 29 alters the resolution and quality of the image data, and the encoding mode. When the output medium such as e-mail is used for the "internet facsimile function", the facsimile section 26 alters the image data so that the output attribute will conform to the medium.

The CPU 21 provides the functions as a signal judgment section 31, an output setting section 32 and a network switching section 33.

The signal judgment section 31 judges the specific signal receivable from the communication network for communication with a predetermined destination. The signal judgment section 31 receives a specific signal as an audio signal, and judges the information indicated by the specific signal, from the presence or absence of the specific signal, and the attribute thereof. The attribute of the specific signal includes the frequency of the specific signal and the receiving frequency thereof. Further, the result of the judgment is stored in the RAM 23 and storage device (not illustrated), for example, and arrangements are made to ensure that the result of judgment is can be used by other sections.

Based on the result of judgment by the signal judgment section 31, the output setting section 32 sets the output attributes including the resolution and quality of the image data to be outputted, and the encoding mode. In conformity to the value of the output attribute, the image converting section 29 converts the image data.

The output setting section 32 stores in advance a plurality of types of output modes representing the combination of the set values with reference to various types of output attributes. These output modes (set statuses) are used as alternatives when the output setting section 32 sets the image data output attribute. The output setting section 32 selects a proper output mode in response to the result of judgment by the signal judgment section 31.

For example, the following three modes are arranged in Advance—a first output mode wherein a greater amount of the image data of higher quality is outputted; a second output mode wherein the image data of normal quality is outputted in a smaller amount than that of the first output mode; and a third output mode wherein the image data is outputted in a smaller amount than that of the second output mode. If the specific signal judgment result indicates communication "on a free basis", there is no charge for communication in conformity to communication time. Accordingly, the output setting section 32 selects the first output mode. If the judgment result indicates communication on a paid basis at a high rate, the charge will be incurred for communication in conformity to communication time. Accordingly, the third output mode characterized by low quality and smaller amount of image data is selected to ensure that the communication will be completed in a shorter time. In the case of communication on a paid basis at a lower rate, the second output mode characterized by normal quality is selected. As described above, the output setting section 32 selects the output mode in conformity to the charge scheme identified from the specific signal judgment result, and adjusts the amount of image data.

To put it in greater details, not all the output attributes are determined according to the output mode selected by the output setting section 32. The final output attributes are determined, including the capability exchange with the destination (G3 facsimile transmission procedure, Phase B, based on ITU-T Recommendation T.30). However, a decision on whether the amount of image data should be reduced or not can be made prior to capability exchange. This is because the specific signal judgment result is used.

It is also possible to make such arrangements that the user determines the set value for various types of output attributes registered in the output mode. Further, it is also possible to arrange such a configuration that the user is notified of the specific signal judgment result and the user selects output mode, based on the judgment result.

The network switching section 33 checks if the communication medium used for outputting the image data can be used or not. Further, the network switching section 33 switches the communication networks to perform communication, according to the output mode selected by the output setting section 32. To put it more specifically, the networks connected with the communication section 28 are switched among the IP communication network, public telephone and other networks.

To put it in greater details, the communication medium and output attribute corresponding to the communication medium are registered in the output mode as a pair. When the output mode is selected, the communication medium and output medium are selected collectively. For example, use of the electronic mail based on the T.37 as the communication medium, and the set value of the output attribute corresponding thereto (e.g. changing the encoding mode into the MH (Modified Huffman)) are registered in the output mode as a pair. In this case, if this output mode is selected, the network switching section 33 switches the communication medium over to the electronic mail. The output setting section 32 sets the output attribute corresponding to that communication medium. The output attribute and communication medium need not be registered collectively. They can be set at different times.

The VoIP communication charge is incurred or not incurred, depending on the destination. The charge depends on the communication path for exchanging data with the destination. The following describes the communication path pattern and presence or absence of the charge in relation to this pattern.

Figure 3:
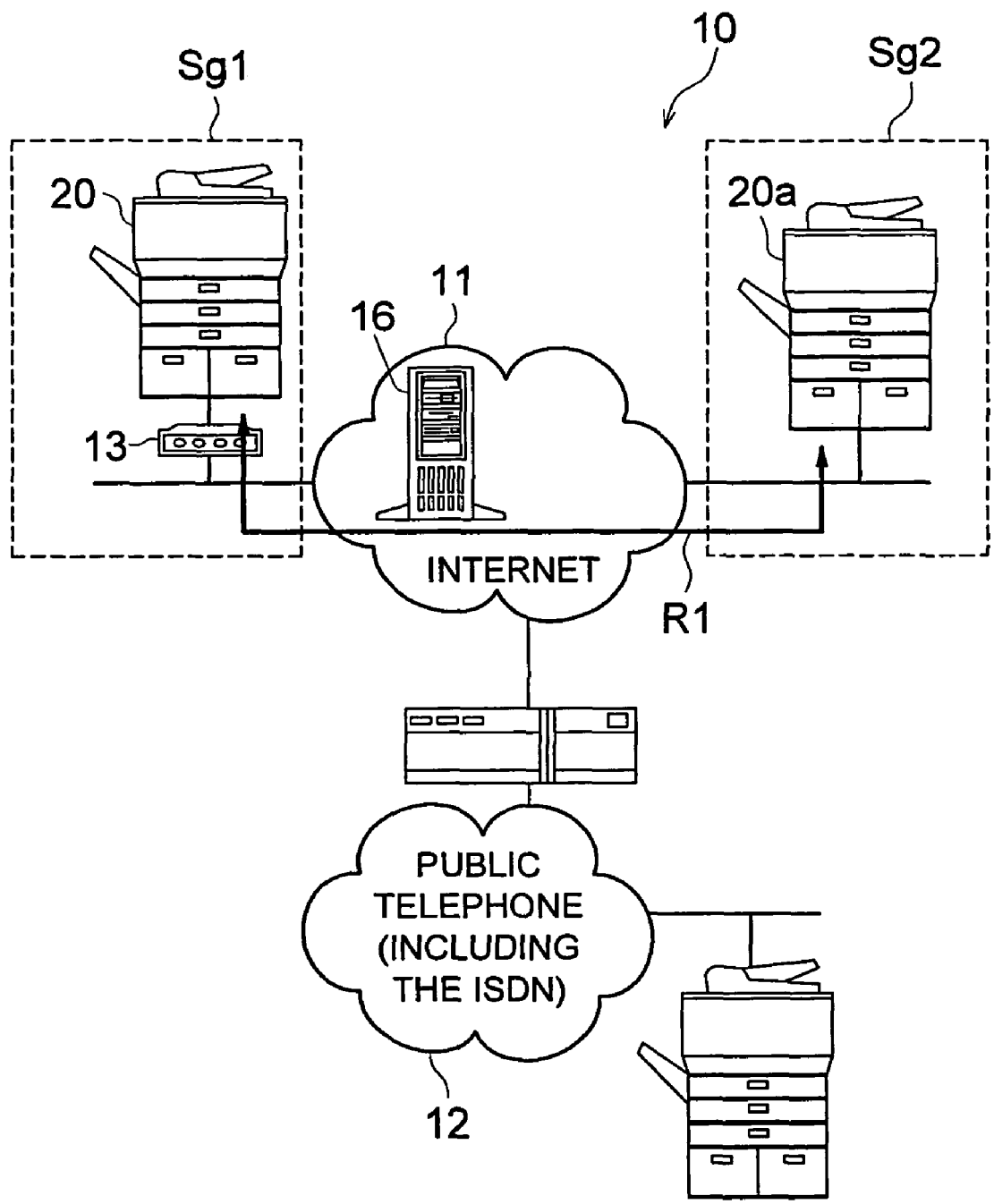
FIG. 3 is an explanatory diagram representing an example of the communication path for outputting the image data to the image communication apparatus connected to the public telephone network using the VoIP communication.

FIG. 3 shows the communication path R1 established between the image communication apparatus 20 in the network segment Sg1 and the image communication apparatus 20*a* in the network segment Sg2. The communication path R1 connects the image communication apparatus 20 in the network segment Sg1 to the image communication apparatus 20*a* in the network segment Sg2 via the Internet 11.

The network segment Sg1 and network segment Sg2 each utilize the same VoIP carrier and VoIP communication method. This arrangement allows the data packets of the VoIP communication to be transmitted and received directly via the Internet 11. No charge is incurred, similarly to the data packets of electronic mail and home page viewing. In principle, there is no difference from communication by telephone extension between the apparatuses connected to the same network segment.

In response to the call originated by the image communication apparatus 20 (request for access to the destination), the call control server 16 grasps the communication path R1 to the image communication apparatus 20*a* designated as the destination by the image communication apparatus 20, and sends the path information to the adaptor 13. Based on the path information received from the call control server 16, the adaptor 13 sends the specific signal as an audio signal to the image communication apparatus 20 before communication is established, notifying that no charge will be incurred (free communication). Upon receipt of this specific signal, the image communication apparatus 20 pass judgment, whereby the output mode according to the judgment result can be selected prior to establishment of communication. After the specific signal has been sent, the adaptor 13 establishes the communication path R1 between the image communication apparatus 20 and image communication apparatus 20*a*, based on the path information. Then data packets are exchanged so that communication is started.

Figure 4:
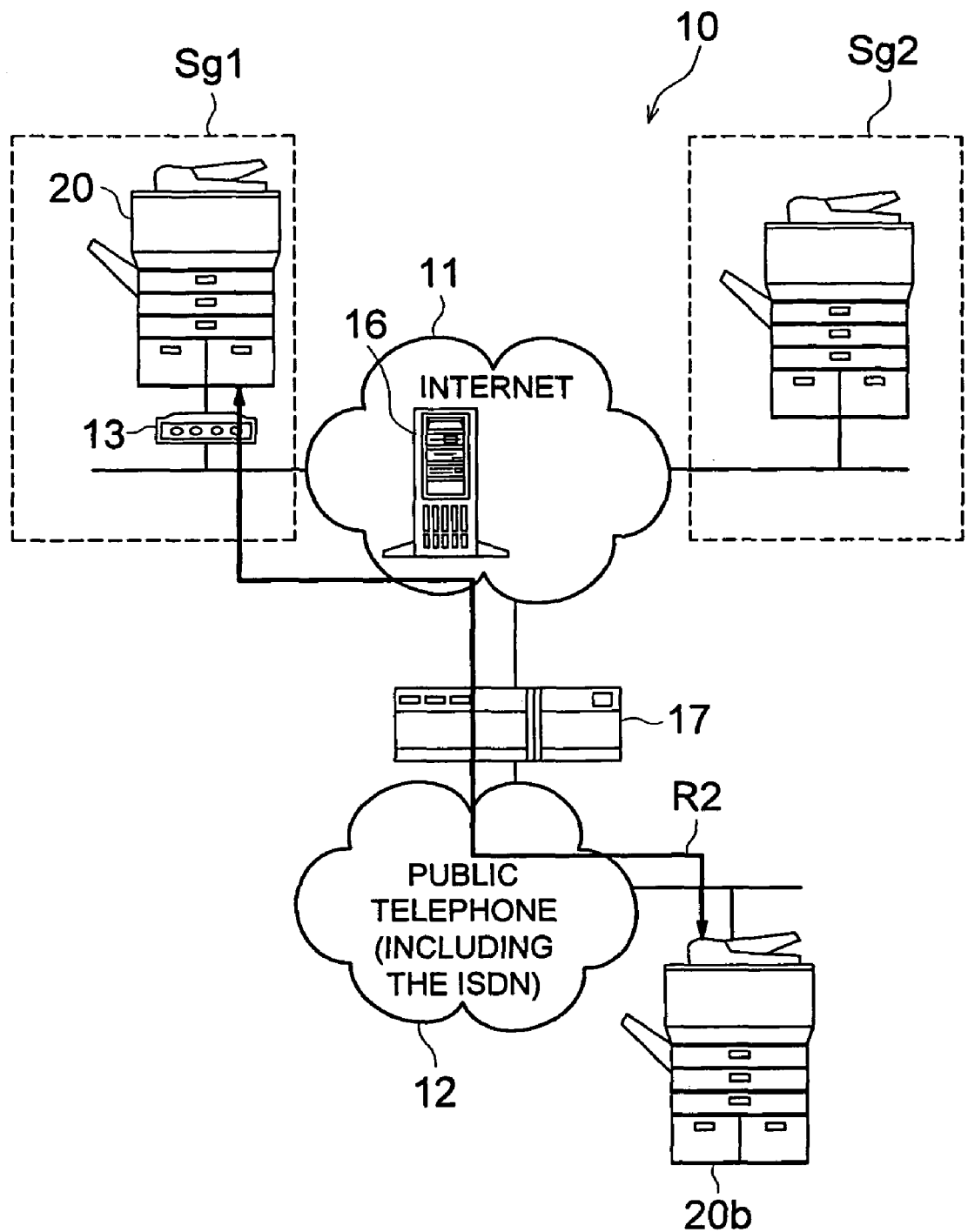
FIG. 4 is an explanatory diagram representing an example of the communication path for outputting the image data to the image communication apparatus connected to the IP communication network via the public telephone network using the VoIP communication.

FIG. 4 shows the communication path R2 established between the image communication apparatus 20 in the network segment Sg1 and the image communication apparatus 20*b* connected with the public telephone network 12.

The communication path R2 connects the image communication apparatus 20 in the network segment Sg1 to the image communication apparatus 20*b* connected with the public telephone network 12 via the gateway 17. By passing through the gateway 17, VoIP communication is implemented between the Internet 11 and public telephone network 12. To put it in greater details, the data packets of the VoIP communication outputted from the adaptor 13 are converted into the digital audio data by the gateway 17 and are sent to the image communication apparatus 20*b* on the public telephone network 12.

In the communication using the communication path R2, the charge for utilizing the public telephone network 12 will be incurred since the public telephone network 12 is used, with the result that VoIP communication using the communication path R2 will be provided on a paid basis.

In response to the call originated by the image communication apparatus 20, the call control server 16 grasps the communication path R2 to the image communication apparatus 20*b* designated as the destination by the image communication apparatus 20, and sends the path information to the adaptor 13. Based on the path information received from the call control server 16, the adaptor 13 sends the specific signal as an audio signal to the image communication apparatus 20 before communication is established, notifying that charge will be incurred (paid communication). Upon receipt of this specific signal, the image communication apparatus 20 passes judgment prior to establishment of communication, whereby the output mode according to the judgment result can be selected prior to establishment of communication.

After the specific signal has been sent, the adaptor 13 establishes the communication path R2 between the image communication apparatus 20 and image communication apparatus 20*b*, based on the path information, whereby communication is started.

Figure 5:
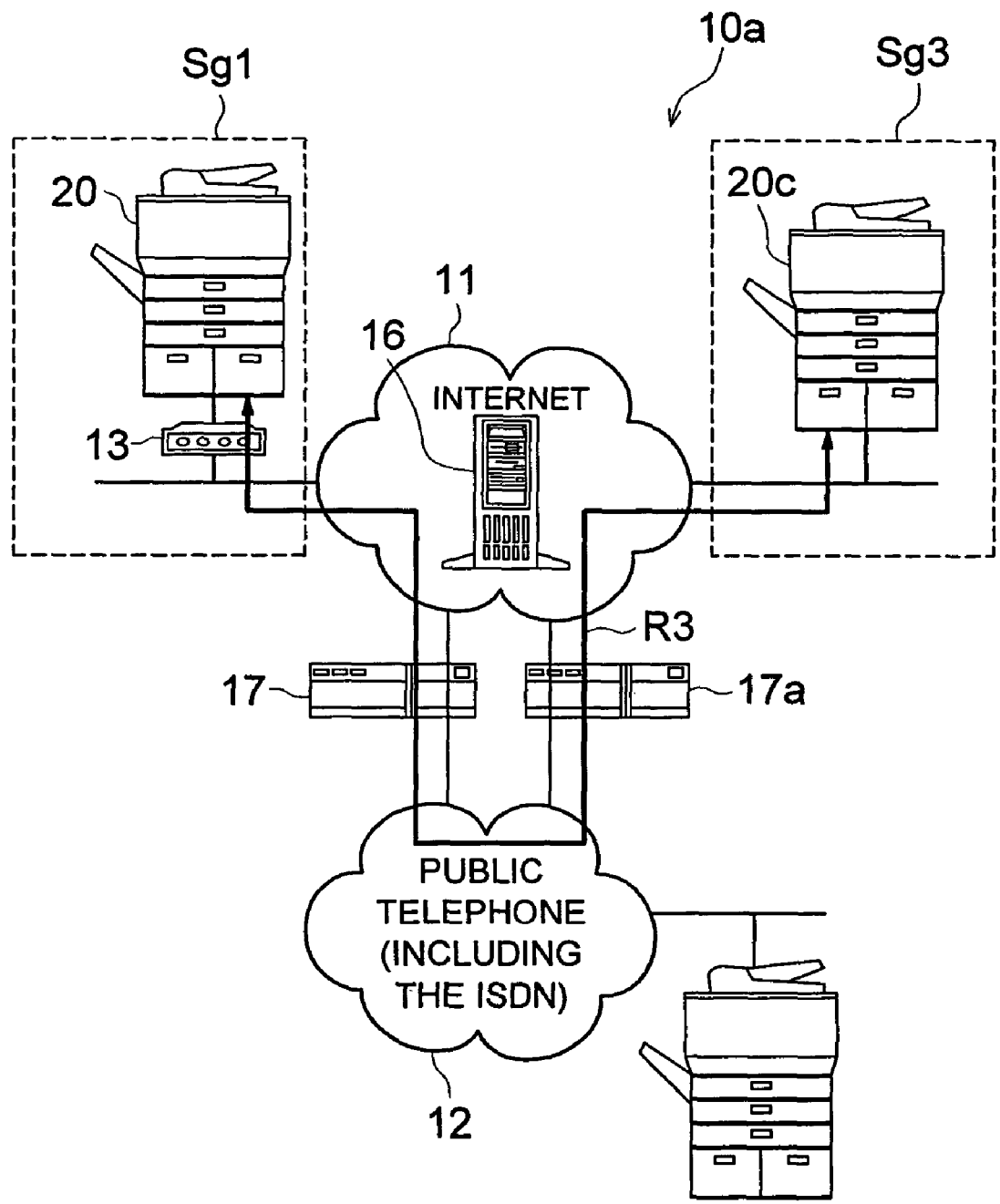
FIG. 5 is an explanatory diagram representing an example of the communication path for outputting the image data to the image communication apparatus connected to the IP communication network using the VoIP communication.

FIG. 5 shows the communication path R3 established between the image communication apparatus 20 in the network segment Sg1 and the image communication apparatus 20c in the network segment Sg3, in the image communication system 10a.

The image communication system 10a represents a system wherein the network segment Sg2 of the image communication system 10 is replaced by the network segment Sg3 that uses another VoIP carrier. To put it another way, the VoIP carriers and VoIP communication methods used by the network segment Sg1 and network segment Sg3 are different.

The communication path R3 connects the image communication apparatus 20 of the network segment Sg1 with the image communication apparatus 20c of the network segment Sg3 via the public telephone network 12. To put it in greater details, the communication path R3 is uses the public telephone network 12 through the gateway 17 installed by the VoIP carrier of the network segment Sg1 and the gateway 17a installed by the VoIP carrier of the network segment Sg3.

When the VoIP communication method used by the source of communication is different from that used by the destination of communication, the data packets may be sent and received directly via the Internet 11. If this occurs, a failure tends to result due to the different methods, when data packets are converted into audio signal. To avoid this, the communication path R3 is selected, wherein the data packets outputted from the adaptor 13 are converted into the audio signals by the gateway 17 and are passed through the public telephone network 12. These signals are converted into the data packets of the optimum type by the gateway 17a installed by the VoIP carrier on the destination side, whereby VoIP communication is implemented.

The call control server 16 checks the VoIP communication method used by the image communication apparatus 20 on the source side and that used by the image communication apparatus 20c on the destination side. If any difference has been found out between the two, the path information of the communication path R3 passing through the public telephone network 12 is sent to the adaptor 13.

Based on the path information received from the call control server 16, the adaptor 13 sends the specific signal as an audio signal to the image communication apparatus 20, notifying that charge will be incurred. If there is any difference between VoIP communication charges using the communication path R2 shown in FIG. 4 and the communication path R3 shown in FIG. 5, the adaptor 13 grasps the difference according to the path information shown by the call control server 16, and sends a specific signal for identifying the difference.

In some cases, an apparatus is installed to ensure that, even if the network segregation on the source side and that on the destination side use the different VoIP carriers and VoIP communication methods, communications between the two different network segments are compatible with each other. Thus, no charge is imposed on the VoIP communication using this apparatus. In other cases, even if the network segment on the destination side and that on the source side use one and the same VoIP communication method, a billing server or other device is used for management of the VoIP communication, with the result that communication charges are incurred. In any case, a specific signal is sent to the image communication apparatus 20, indicating the distinction between free and paid communications in the VoIP communication, and the difference in communication charges.

FIGS. 3 through 5 show an example of image data being outputted by the image communication apparatus 20 through the adaptor 13 using VoIP communication. When image data is outputted from the image communication apparatus 20a or 20c connected directly to the LAN using the VoIP communication, a specific signal showing the charge is sent from an apparatus (not illustrated) for controlling the VoIP communication, to the image communication apparatus 20a or 20c. Accordingly, similarly to the image communication apparatus 20, the image communication apparatus 20a or 20c is capable of receiving and judging the specific signal. It is also possible to arrange such a configuration that the special signal having been received is directly subjected to analysis, without being converted into an audio signal.

Figure 6:
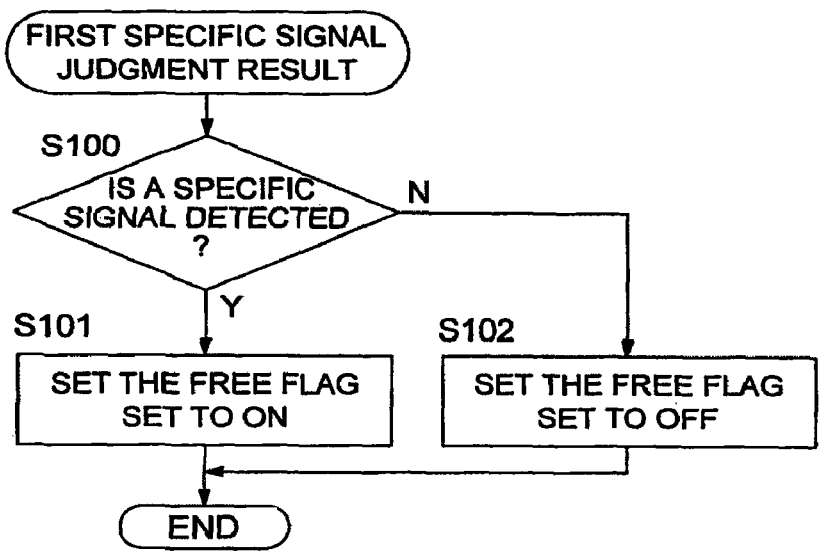
FIG. 6 is a flowchart representing the process of the first specific signal judgment for determining the presence or absence of a specific signal.
Figure 7:
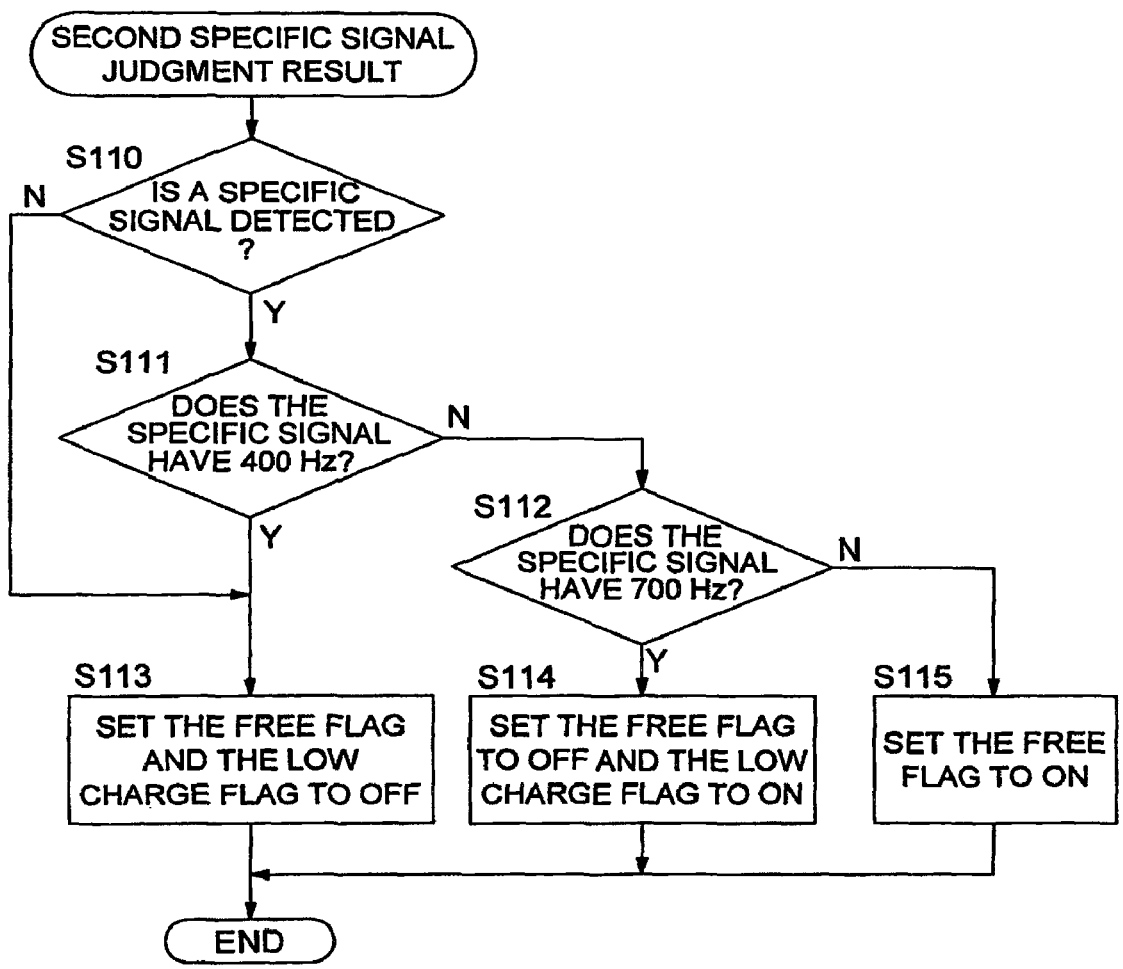
FIG. 7 is a flowchart representing the process of the second specific signal judgment for determining the frequency of a specific signal.
Figure 8:
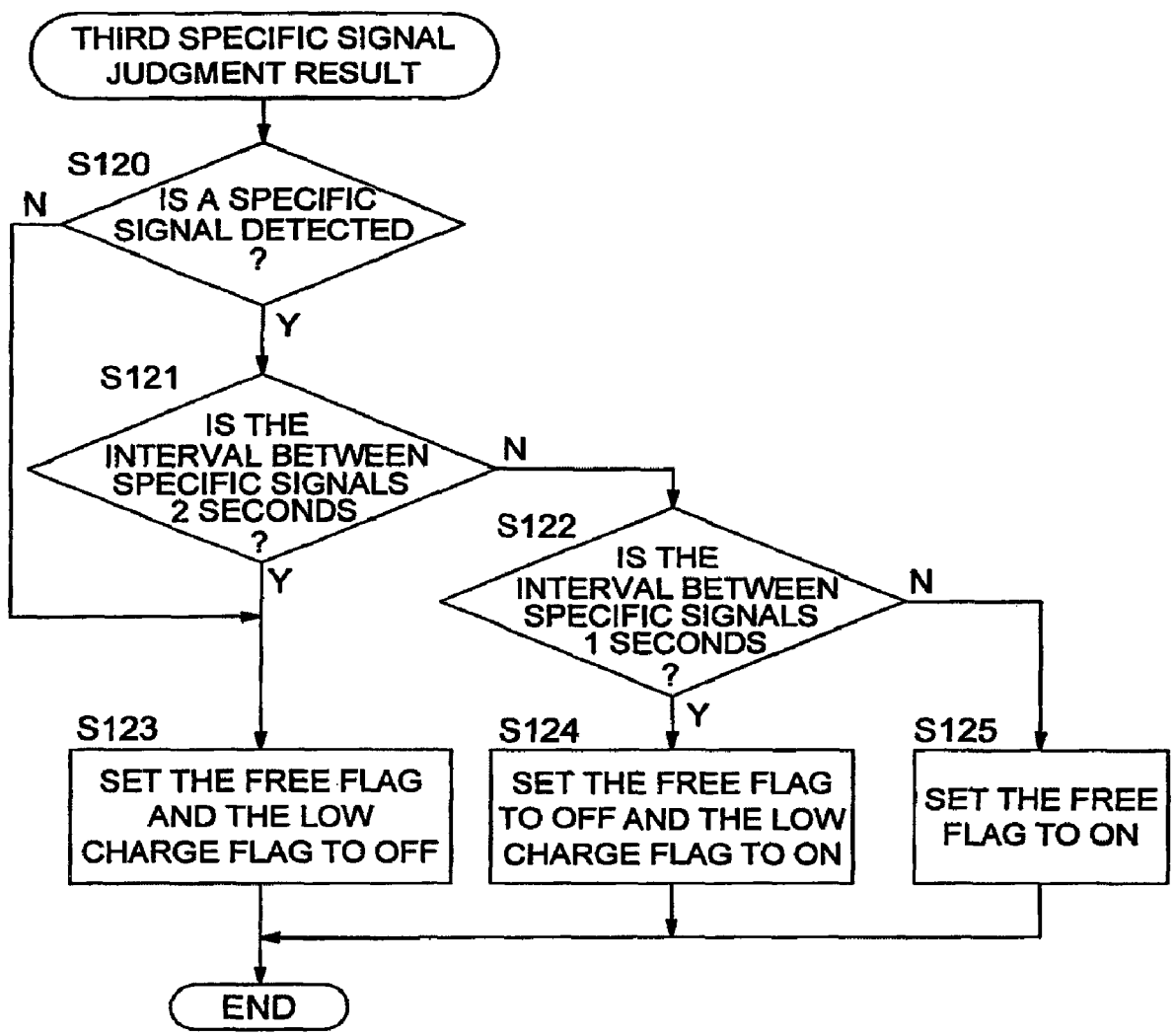
FIG. 8 is a flowchart representing the process of the third specific signal judgment for determining the transmission interval of a specific signal.

FIGS. 6 through 8 show the flow in the processing of specific signal judgment wherein the specific signal received by the image communication apparatus 20 is judged. The specific signal is available in a plurality of types. The typical three types will be described below:

FIG. 6 shows the flow in the processing of the first specific signal judgment wherein the specific signal representing the distinction between free and paid communications is judged.

The signal judgment section 31 checks (Step S100) whether or not a specific signal has been issued before a ringing tone. If the specific signal has been detected (Y in Step S100), the communication with the destination is free of charge, and the free flag is set to ON (Step S101). If the specific signal cannot be detected (N in Step S100), communication with the destination is on a paid basis, and the free flag is set to OFF (Step S102). Then the processing terminates (END).

FIG. 7 shows the flow in the processing of the second specific signal judgment wherein the specific signal uses the frequency to show the distinction between free and paid communications and/or the difference in communication charges. In this case, the frequency is set to 400 Hz for a high communication charge, to 700 Hz for a low communication charge, and to 1,200 Hz for free communication.

The signal judgment section 31 checks whether or not a specific signal has been received before a ringing tone (Step S110). If the specific signal has been detected (Y in Step S110), a check is made to see whether or not the frequency is 400 Hz (Step S111). If the frequency is 400 Hz (Y in Step S111), communication with the destination will be expensive, and the free flag is set to OFF (Step S113). Then the processing terminates (END).

If the specific signal cannot be detected (N in Step S110), the distinction between free and paid communications or the difference in communication charges cannot be found out. Assuming the highest communication charge, the free flag is set to OFF, and the low charge flag is set to OFF (Step S113). Then the processing terminates (END).

When the detected frequency is 700 Hz (N in Step S111 and Y in Step S112), communication will be less expensive. The free flag is set to OFF, and the low charge flag is set to ON (Step S114). Then the processing terminates (END).

When the detected frequency is neither 400 Hz nor 700 Hz (N in Step S111 and N in Step S112), communication with the destination is free, and the free flag is set to ON (Step S115). Then the processing terminates (END).

FIG. 8 shows the flow in the processing of the third specific signal judgment wherein the specific signal uses the difference in transmission intervals to show the distinction between free and paid communications and/or the difference in communication charges. In this case, if the transmission interval is two seconds, communication is on a paid basis and the communication charge is expensive. If it is one second, communication is on a paid basis and communication is low. When the communication is free, specific signals will be issued three times on running. After the lapse of a predetermined time interval, specific signals will be issued three times on running again. This cycle is repeated.

The signal judgment section 31 checks whether or not a specific signal has been received before a ringing tone (Step S120). If the specific signal has been detected (Y in Step S120), a check is made to see whether or not transmission interval is 2 seconds (Step S121). If the transmission interval is 2 seconds (Y in Step S121), communication with the destination is expensive. The free flag is set to OFF, and the low charge flag is set to OFF (Step S123). Then the processing terminates (END).

If the specific signal cannot be detected (N in Step S120), the distinction between free and paid communications or the difference in communication charges cannot be found out. Assuming the highest communication charge, the free flag is set to OFF, and the low charge flag is set to OFF (Step S123). Then the processing terminates (END).

If the transmission interval is one second (N in Step S121 and Y in Step S122), communication with the destination is less expensive. The free flag is set to OFF, and the low charge flag is set to ON (Step S124). Then the processing terminates (END).

If the specific signal transmission interval is neither one nor two seconds (N in Step S121 and N in Step S122), communication with the destination is free, and the free flag is set to ON (Step S125). Then the processing terminates (END). As has been made clear from the above, the specific signal having been received indicates the distinction between free and paid communications, and/or the difference in communication charges for communication with the destination.

Figure 9:
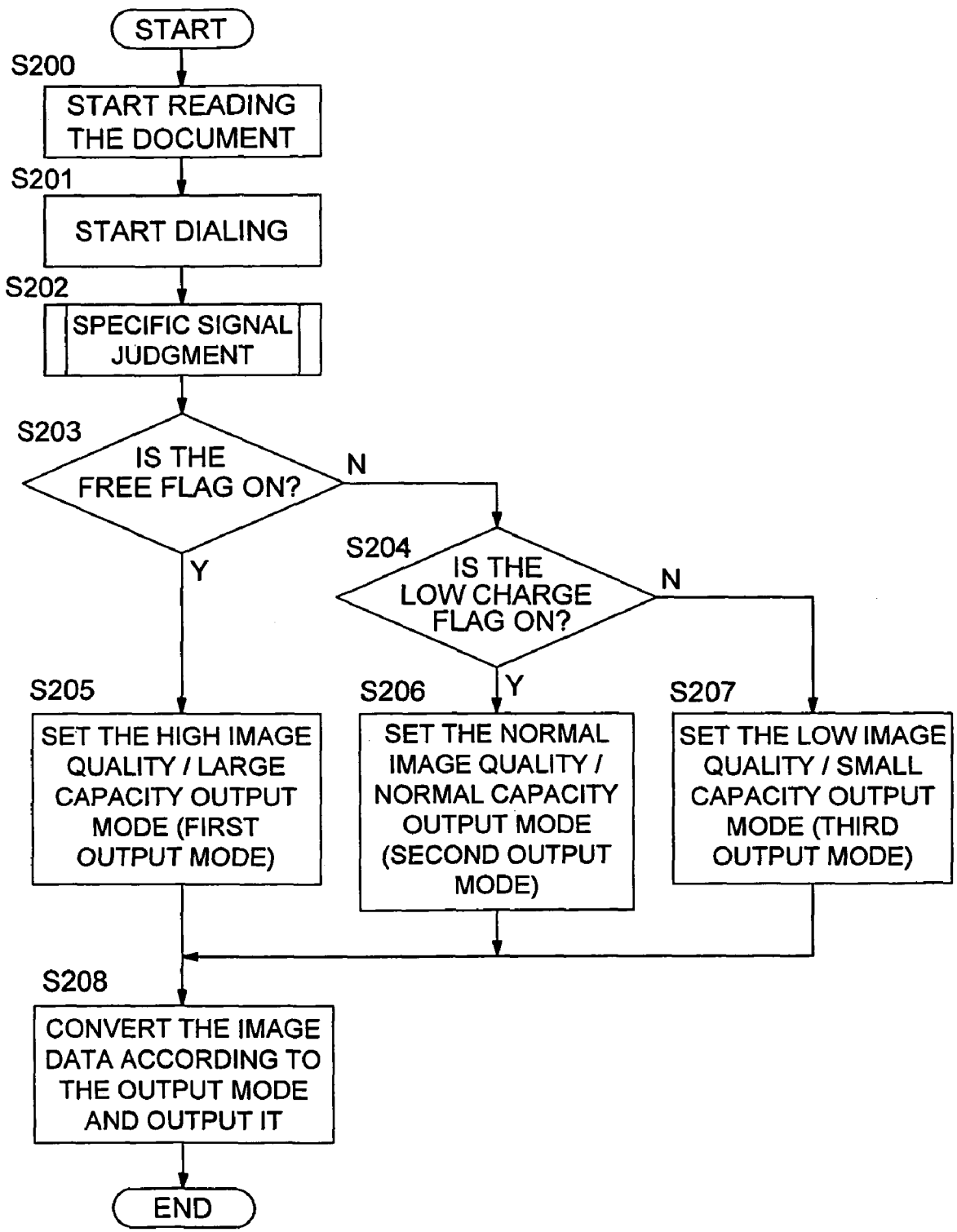
FIG. 9 is a flowchart representing the process wherein the image communication apparatus of the present invention selects and outputs the image data output mode, based on the result of specific signal judgment.

FIG. 9 shows the flow in the process wherein the image communication apparatus 20 of the present invention sets the output attribute according to the specific signal from the IP communication network and outputs the image data.

In the image communication apparatus 20, the reading section 24 starts reading a document (Step S200), and the image data of the document having been read is stored in the RAM 23. A call is originated to the destination using the VoIP communication (Step S201), and processing of specific signal judgment is applied (Step S202). Which of the processes of specific signal judgment should be implemented can be determined by the user in response to type of the specific signal provided by the IP communication network having been accessed. Alternatively, it is also possible to arrange such a configuration that the features of the specific signal having reached are judged by the image communication apparatus 20, and the process of specific signal judgment to be implemented is automatically selected in response to the result of this judgment.

The output setting section 32 checks the free flag to determine whether or not communication charge is incurred for the communication path for outputting the image data to the destination (Step S203). If the free flag is set to ON (Y in Step S203), there is no need to worry about the communication charge for outputting the image data to the destination. In this case, the output mode (first output mode) characterized by high image quality, large data capacity and hence a long communication time will be selected (Step S205).

If the free flag is set to OFF (N in Step S203), the communication for outputting the image data to the destination is on a paid basis. Based on the low charge flag, the output setting section 32 determines the difference in the communication charges outputting the image data to the destination (Step S204).

If the low charge flag is set to ON (Y in Step S204), the communication charge is low, and the output mode (second output mode) characterized by normal image quality and normal data capacity will be selected (Step S206). If the low charge flag is set to OFF (N in Step S204), the communication charge is high, and the output mode (third output mode) characterized by low image quality and small data capacity will be selected to complete the communication in a shorter time (Step S207).

According to the selected output mode, the image data converted by the image converting section 29 is outputted to the destination (Step S208), and the processing then terminates (END).

As described above, the specific signal is judged before establishment of communication, and the output mode is selected in response to the result of judgment. This arrangement allows the charge conditions to be grasped before the communication is established. If the communication is free as a result of grasping, the output mode characterized by high image quality and large data capability can be selected. If the communication is on a paid basis as a result of grasping, an output mode is selected in response to the charge to be paid, whereby adjustment between the communication time and charge can be provided. This arrangement protects the user from having to make a decision on charges.

Figure 10:
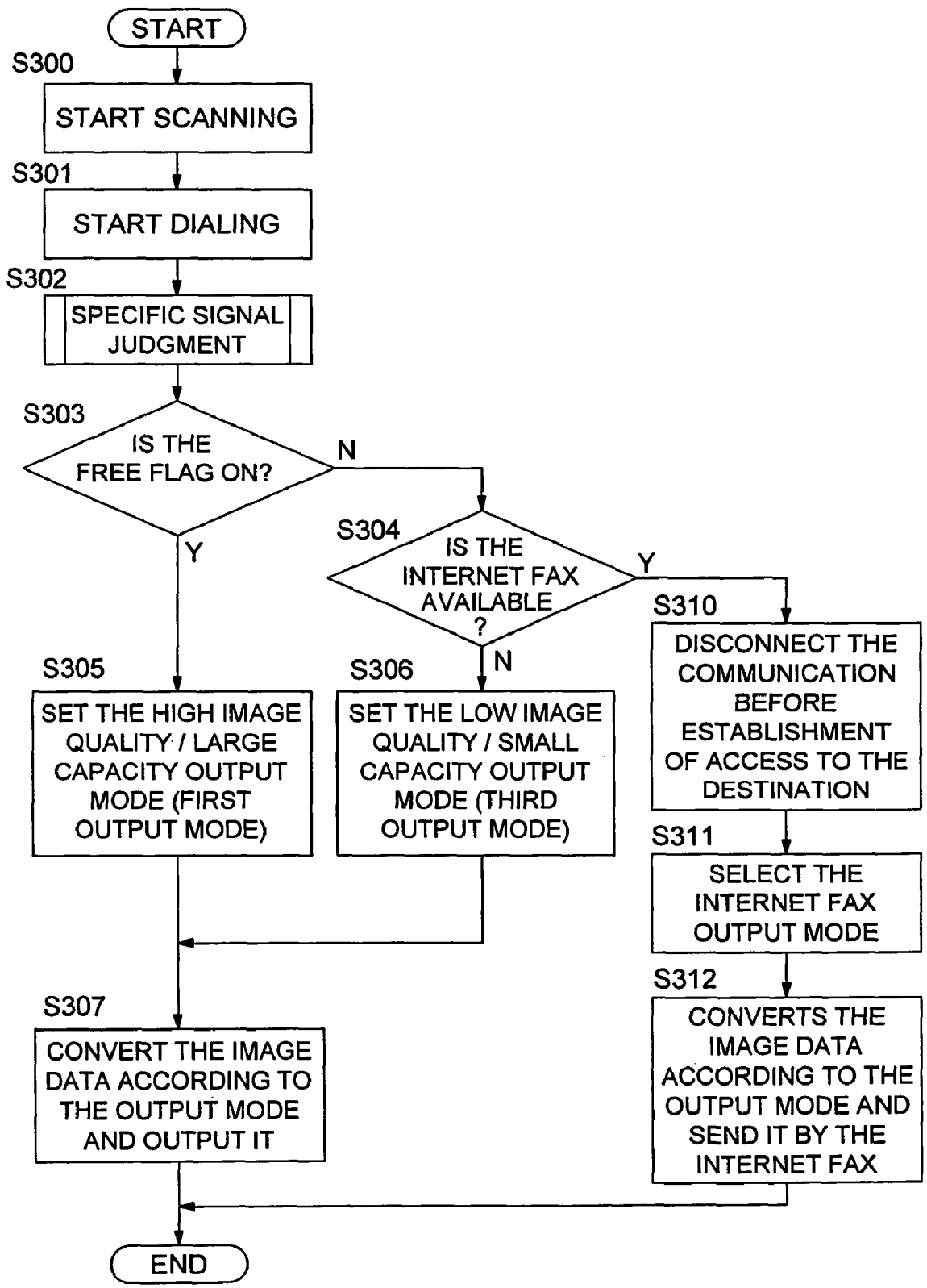
FIG. 10 is a flowchart representing the process wherein the image communication apparatus of the present invention selects and outputs the communication medium used to output image data, based on the result of specific signal judgment.

FIG. 10 shows the flow of the processing wherein the image communication apparatus 20 sets the output attribute based on the specific signal from the IP communication network, and selects the communication medium, thereby outputting the image data.

A document is read by the reading section 24 (Step S300) and the image data of the document having been read is stored in the RAM 23. A call is originated to the destination using the VoIP communication (Step S301), and the processing of specific signal judgment is applied (Y in Step S302). If the free flag is set to ON (Y in Step S303), the output mode (first output mode) characterized by high image quality and large data capability is selected (Step S305). According to the output mode having been selected, the image data having been converted by the image converting section 29 is outputted to the destination (Step S307). Then the processing terminates (END).

If the free flag is set on OFF (N in Step S303), the network switching section 33 takes a judgment step to see if other communication medium than the VoIP communication is available or not (Step S304). In this case, a check is made to see if the internet facsimile function (method using the electronic mail based on the T.37 (hereinafter referred to as "T.37 method")) is available or not. For example, the T.37 method is judged as being not available, if the mode with the T.37 method registered therein as a communication medium is not found in the output modes that can be selected, if the reaction from the mail server cannot be detected, or if it has been notified that the destination is incapable of receiving mail.

When the T.37 method is not available (N in Step S304), the output setting section 32 selects the output mode (third output mode) characterized by low image quality and small data capacity (Step S306). The image data having been converted by the image communication apparatus 20 according to the output mode is outputted to the destination (Step S307), and the processing terminates (END).

When the T.37 method is used (Y in Step S304), communication by VoIP communication medium is disconnected (Step S310) before communication is established, and the output mode where the T.37 method is registered as a communication medium is selected (Step S311). The image data is converted by the image converting section 29 according to the output attribute registered in this output mode. After conversion, the image data is outputted by electronic mailing (Step S312), and the processing terminates (END).

As described above, when the VoIP communication is carried out on a paid basis, the communication medium is switched over to the electronic mail using the internet facsimile function. This arrangement reduces the image data transmission charge.

The embodiment of the present invention has been described with reference to drawings. It should be noted, however, that the specific arrangement is not restricted to the aforementioned example. The present invention can be embodied in a great number of variations with appropriate modification or additions, without departing from the spirit and scope of the present invention In the embodiment, the IP communication network and public telephone network are used as the network. It is also possible to use other forms of network.

The aforementioned description of the embodiment has referred to the image communication apparatus. It is possible to use an image communication program mounted on a personal computer, for example. It is also possible to a videophone using the VoIP communication wherein the image data compression method is altered in response to a specific signal.

In the aforementioned embodiment, an audio signal is used as a specific signal. However, other forms of signals may be used. For example, an optical signal or video signal may be utilized as a specific signal. It is also possible to arrange such a configuration that a data packet is received as a specific signal, and the header information contained therein is used to determine if the communication path is on a free basis or not. The information shown by the specific signal can be the one that distinguishes between the IP communication network and public telephone network, without indicating communication charges. Alternatively, it can be the information that identifies the network quality. This arrangement allows the image communication apparatus 20 to receive a greater variety of specific signals and to identify them. Further, the specific signal is issued in response to the path used for the communication with a particular destination. This makes it possible to set the output attribute more closely in conformity to the destination.

In the aforementioned embodiment, a specific signal is received and judged before communication is established. Before the output attribute such as image quality is determined according to the G3 facsimile transmission procedure, phase B based on the ITU-T Recommendation T.30, it is possible to set the optimum output attribute by taking into account both the result of capability exchange and the output attribute registered in the output mode selected by the output setting section 32. Even after the capability exchange, the communication time can be reduced to cut down the communication charge, if the output attribute is altered in the middle of communication in response to the output attribute registered in the output mode selected by the output setting section 32.

In the aforementioned embodiment, the specific signal is judged by using any one of the first through third processes of specific signal judgment. It is also possible to arrange such a configuration that the specific signal is judged by integrating these processes or combining them with other factors. This will make it possible to use a complicated specific signal containing a mixture of a plurality of factors, for example, a specific signal as a melody produced by a combination of a specific scale (frequency) and rhythm (transmission interval).

In the aforementioned embodiment, the image data of the read document is once stored and is then outputted. However, reading can be started after a call has been originated. This arrangement allows processing to be performed without worrying about storage capacity, and permits reading to be carried out in conformity to the output attribute determined in the final phase. This eliminates the need of converting the resolution of the already read image data.

In the aforementioned embodiment, the output attributes set in response to the specific signal include the image data quality, resolution and encoding mode. Without being restricted thereto, the set output attributes can include others if they are related to the image data rotational direction, reduction rate of the image data and color/monochromatic mode, for example.

In the aforementioned embodiment, the output mode is selected after the specific signal has been received, and the resolution of the image data and others are converted. It is also possible to arrange such a configuration that image data is converted and stored in advance by the image converting section 29 for each assumed output mode. Then the image data corresponding to the result of specific signal judgment is selected from these pieces of data converted and stored, and is outputted. This arrangement ensures image data to be outputted immediately after judgment of the specific signal.

In the aforementioned embodiment, the output mode is automatically selected by the output setting section 32. It is also possible to make such arrangements that the specific signal is judged, and based on the result of judgment, the output mode alternatives that can be set is displayed on the display/operation section 27 as an display unit. A desired output mode out of the displayed output mode alternatives is selected by the display/operation section 27 as a selection unit. Based on the selected output mode, the image data output attribute is set. It is also possible to arrange such a configuration that selection of the output mode by the user is accepted by the display/operation section 27, and this result is used in preference to the automatic selection. For example, when the details of a drawing are to be outputted as a high-quality image, high image quality output mode is selected by the user operation. This arrangement ensures high-quality image to be produced, without depending on the result of specific signal judgment.

In the aforementioned embodiment, a specific signal is judged for each communication and the output mode is selected. However, it is also possible to make such arrangements that the previous communication history is stored in a storage device, and the output mode is selected by referencing the stored information. To put it more specifically, the judgment result and/or output attribute settings are stored for each destination of communication. The judgment result and/or output attribute settings are read out, and image data output attribute and output mode are set based on the judgment result and/or output attribute settings having been read. This arrangement allows the optimum output mode to be selected or set, based on the stored information, without the need of judging the specific signal for each communication with the same destination of communication.

In the aforementioned embodiment, the T.37 method is used as the internet facsimile function. However, the T.38 method can also be used. Further, image data can be outputted by using an application working on other IP communication network.

In the aforementioned embodiment, an example of outputting the image data has been described. For example, when acquiring the image data from a predetermined description using the polling function, a specific signal can be judged and the quality of the image data to be received can be selected from the result of this judgment. For example, the capability of displaying from the receiving side to the sending side by capability exchange can be restricted in conformity to the result of judging the specific signal.

In the aforementioned embodiment, the image communication apparatus is described as a multifunction peripheral. However, a computer apparatus equipped with a communication section can also be used if it is an apparatus for transmitting image data. For example, the present invention also covers an application for outputting animations and still image among a plurality of computers, wherein specific signal is judged, and the quality and resolution of the image outputted thereby and the compression method are adjusted. It is also possible to make such arrangements that the aforementioned function is performed by the application program run on the computer apparatus.

In the aforementioned embodiment, the specific signal received is judged according to the destination of communication. A specific signal independent of the destination can also be used for judgment. For example, if reception is possible when linked with the network quality before originating a specific signal for indicating whether the IP communication network is available or not, it is possible to identify whether the IP communication network is available or not, before the destination of communication is specified and a call is originated. Accordingly, if the unavailability of the IP communication network has been identified before a call is originated, the output mode suitable for other available network (e.g. public telephone network) is selected before a call is originated, and the amount of image data is reduced in advance. Such steps can be taken.

The description of the aforementioned embodiment refers to examples wherein the specific signal indicates a communication charge. The present invention is also applicable to the case where specific signal indicates other information. For example, if the specific signal indicates the network quality, ECM (Error Correction Mode) is set to the image data output mode when the network quality has been judged as being poor, and this information can be sent to the other party without fail.

The image communication apparatus of the present invention ensures image data output attribute to be altered according to the information indicated by the specific signal supplied by a communication network. Further, when the specific signal is judged at the time of communication with a destination, this image communication apparatus allows the image data output mode to be changed in conformity to the destination, based on the specific signal received from the communication network. For example, if the specific signal contains the information on charges for communication with the destination, image data can be transmitted using the output attribute conforming to the charges for communication with that destination.

While the preferred embodiments of the present invention have been described using specific term, such description is for illustrative purposes only, and it is to be understood that changes and variations may be made without departing from the spirit and scope of the appended claims.

What is claimed is:

1. An image communication apparatus comprising:
    a specific signal discriminating section to discriminate based on a specific signal received through a communication network so as to output discrimination result information; and
    an output attribute establishing section to establish an output attribute of image data to be outputted to a communicating destination site through the communication network, based on the discrimination result information outputted by the specific signal discriminating section;
    wherein the specific signal discriminating section outputs the discrimination result information at a time point in a range of a time interval, from a first time when the image communication apparatus requests the communication network to establish a connection with the communicating destination site, to a second time when a capability exchanging operation in regard to the output attribute of the image data between the image communication apparatus and the communicating destination site is implemented.

2. The image communication apparatus of claim 1, further comprising:
    a communication medium switching section to switch a communication medium, through which the image data is to be transmitted to the communicating destination site, based on the discrimination result information outputted by the specific signal discriminating section.

3. The image communication apparatus of claim 1, wherein the communication network is an internet protocol communication network.

4. The image communication apparatus of claim 1, wherein the specific signal represents fee information in regard to communication implemented between the image communication apparatus and the communicating destination site.

5. The image communication apparatus of claim 1, wherein the discrimination result information represents a presence or absence of a fee account in regard to communication implemented between the image communication apparatus and the communicating destination site and/or an amount of fee.

6. The image communication apparatus of claim 1, further comprising:
    a storage section to store therein at least one of the discrimination result information and contents of the output attribute, established by the output attribute establishing section, in correlation with the communicating destination site;
    wherein, corresponding to the communicating destination site, the output attribute establishing section reads out the at least one of the discrimination result information and the contents of the output attribute, stored in advance in the storage section, and then, establishes a current output attribute of the image data, based on the at least one of the discrimination result information and the contents of the output attribute, both read out from the storage section.

7. The image communication apparatus of claim 1, wherein the specific signal discriminating section discriminates based on a presence or absence of the specific signal.

8. The image communication apparatus of claim 1, wherein the specific signal discriminating section discriminates based on attributes of the specific signal.

9. The image communication apparatus of claim 1, wherein the specific signal discriminating section discriminates based on communication periods of the specific signal.

10. The image communication apparatus of claim 1, wherein the output attribute establishing section establishes at least two kinds of output attributes, based on the discrimination result information outputted by the specific signal discriminating section.

11. The image communication apparatus of claim 1, wherein a data amount of the image data varies depending on the output attribute established by the output attribute establishing section.

12. The image communication apparatus of claim 1, wherein the output attribute represents at least one of a resolution of an image represented by the image data, an image quality of the image represented by the image data and a data coding mode of the image data.

13. The image communication apparatus of claim 1, wherein, based on the discrimination result information, the output attribute establishing section selects any one of a first outputting mode, a second outputting mode in which an amount of image data is less than that in the first outputting mode and a third outputting mode in which an amount of image data is less than that in the second outputting mode, and then, establishes the output attribute of the image data according to the selected outputting mode.

14. An image communication apparatus comprising:
a specific signal discriminating section to discriminate based on a specific signal received through a communication network so as to output discrimination result information, when the image communication apparatus communicates with a communicating destination site through the communication network; and
an output attribute establishing section to establish an output attribute of image data to be outputted to the communicating destination site through the communication network, based on the discrimination result information outputted by the specific signal discriminating section;
wherein the specific signal discriminating section outputs the discrimination result information at a time point in a range of a time interval, from a first time when the image communication apparatus requests the communication network to establish a connection with the communicating destination site, to a second time when a capability exchanging operation in regard to the output attribute of the image data between the image communication apparatus and the communicating destination site is implemented.

15. The image communication apparatus of claim 14, further comprising:
a communication medium switching section to switch a communication medium, through which the image data is to be transmitted to the communicating destination site, based on the discrimination result information outputted by the specific signal discriminating section.

16. The image communication apparatus of claim 14, wherein the communication network is an internet protocol communication network.

17. The image communication apparatus of claim 14, wherein the specific signal represents fee information in regard to communication implemented between the image communication apparatus and the communicating destination site.

18. The image communication apparatus of claim 14, wherein the discrimination result information represents a presence or absence of a fee account in regard to communication implemented between the image communication apparatus and the communicating destination site and/or an amount of fee.

19. The image communication apparatus of claim 14, further comprising:
a storage section to store therein at least one of the discrimination result information and contents of the output attribute, established by the output attribute establishing section, in correlation with the communicating destination site;
wherein, corresponding to the communicating destination site, the output attribute establishing section reads out the at least one of the discrimination result information and the contents of the output attribute, stored in advance in the storage section, and then, establishes a current output attribute of the image data, based on the at least one of the discrimination result information and the contents of the output attribute, both read out from the storage section.

20. The image communication apparatus of claim 14, wherein the specific signal discriminating section discriminates based on a presence or absence of the specific signal.

21. The image communication apparatus of claim 14, wherein the specific signal discriminating section discriminates based on attributes of the specific signal.

22. The image communication apparatus of claim 14, wherein the specific signal discriminating section discriminates based on communication periods of the specific signal.

23. The image communication apparatus of claim 14, wherein the output attribute establishing section establishes at least two kinds of output attributes, based on the discrimination result information outputted by the specific signal discriminating section.

24. The image communication apparatus of claim 14, wherein a data amount of the image data varies depending on the output attribute established by the output attribute establishing section.

25. The image communication apparatus of claim 14, wherein the output attribute represents at least one of a resolution of an image represented by the image data, an image quality of the image represented by the image data and a data coding mode of the image data.

26. The image communication apparatus of claim 14, wherein, based on the discrimination result information, the output attribute establishing section selects any one of a first outputting mode, a second outputting mode in which an amount of image data is less than that in the first outputting mode and a third outputting mode in which an amount of image data is less than that in the second outputting mode, and then, establishes the output attribute of the image data according to the selected outputting mode.

27. An image communication apparatus comprising:
a specific signal discriminating section to discriminate based on a specific signal received through a communication network so as to output discrimination result information;
a display section to display a plurality of candidate output modes, which can be established, based on the discrimination result information outputted by the specific signal discriminating section;
a selecting section to select a desired output mode from the plurality of candidate output modes displayed on the display section;
an output attribute establishing section to establish an output attribute of image data to be outputted to a communicating destination site through the communication network, based on the desired output mode selected by the selecting section;
wherein the specific signal discriminating section outputs the discrimination result information at a time point in a range of a time interval, from a first time when the image communication apparatus requests the communication network to establish a connection with the communicating destination site, to a second time when a capability exchanging operation in regard to the output attribute of the image data between the image communication apparatus and the communicating destination site is implemented.

28. The image communication apparatus of claim 27, further comprising:
a communication medium switching section to switch a communication medium, through which the image data is to be transmitted to the communicating destination site, based on the desired output mode selected by the selecting section.

29. The image communication apparatus of claim 27, wherein the communication network is an internet protocol communication network.

30. The image communication apparatus of claim 27, wherein the specific signal represents fee information in regard to communication implemented between the image communication apparatus and the communicating destination site.

31. The image communication apparatus of claim 27, wherein the discrimination result information represents a presence or absence of a fee account in regard to communication implemented between the image communication apparatus and the communicating destination site and/or an amount of fee.

32. The image communication apparatus of claim 27, further comprising:

a storage section to store therein at least one of the discrimination result information and contents of the output attribute, established by the output attribute establishing section, in correlation with the communicating destination site;

wherein, corresponding to the communicating destination site, the output attribute establishing section reads out the at least one of the discrimination result information and the contents of the output attribute, stored in advance in the storage section, and then, establishes a current output attribute of the image data, based on the at least one of the discrimination result information and the contents of the output attribute, both read out from the storage section.

33. The image communication apparatus of claim 27, wherein the specific signal discriminating section discriminates based on a presence or absence of the specific signal.

34. The image communication apparatus of claim 27, wherein the specific signal discriminating section discriminates based on attributes of the specific signal.

35. The image communication apparatus of claim 27, wherein the specific signal discriminating section discriminates based on communication periods of the specific signal.

36. The image communication apparatus of claim 27, wherein the output attribute establishing section establishes at least two kinds of output attributes, based on the discrimination result information outputted by the specific signal discriminating section.

37. The image communication apparatus of claim 27, wherein a data amount of the image data varies depending on the output attribute established by the output attribute establishing section.

38. The image communication apparatus of claim 27, wherein the output attribute represents at least one of a resolution of an image represented by the image data, an image quality of the image represented by the image data and a data coding mode of the image data.

39. The image communication apparatus of claim 27, wherein, based on the discrimination result information, the output attribute establishing section selects any one of a first outputting mode, a second outputting mode in which an amount of image data is less than that in the first outputting mode and a third outputting mode in which an amount of image data is less than that in the second outputting mode, and then, establishes the output attribute of the image data according to the selected outputting mode.

* * * * *